United States Patent [19]

Needham

[11] 4,068,717
[45] Jan. 17, 1978

[54] PRODUCING HEAVY OIL FROM TAR SANDS

[75] Inventor: Riley B. Needham, Bartlesville, Okla.

[73] Assignee: Phillips Petroleum Company, Bartlesville, Okla.

[21] Appl. No.: 646,468

[22] Filed: Jan. 5, 1976

[51] Int. Cl.$^2$ ............................................. E21B 43/24
[52] U.S. Cl. .................................. 166/272; 166/263; 166/274; 166/271
[58] Field of Search ............... 166/272, 261, 271, 263, 166/273, 274

[56] References Cited

U.S. PATENT DOCUMENTS

| | | | |
|---|---|---|---|
| 2,866,507 | 12/1958 | Bond et al. | 166/274 |
| 3,280,909 | 10/1966 | Closmann et al. | 166/263 |
| 3,330,346 | 7/1967 | Jacobs et al. | 166/273 |
| 3,412,793 | 11/1968 | Needham | 166/261 |
| 3,464,491 | 9/1969 | Froning | 166/272 X |
| 3,504,745 | 4/1970 | Elkins | 166/272 X |
| 3,908,762 | 9/1975 | Redford | 166/263 |

*Primary Examiner*—Stephen J. Novosad

[57] ABSTRACT

A method is provided for recovering heavy oil from an underground tar sand reservoir by injecting steam into an injection well penetrating the reservoir sufficiently to fracture the tar sand and provide passage for the steam through the tar sand to a production well piercing the tar sand reservoir. Steam is provided at sufficient heat to mobilize heavy oil from the permeated tar sand and a pressure sufficient to maintain competency of the formation to permit continued flow from the injection well to the production well. Injection of surfactant into the tar sand reservoir is used to produce a condensible foam which aids in maintaining back pressure on the injected steam within the tar sand reservoir to maintain the competency of the formation and to cause further permeation of the formation by the steam. Foam can be produced of strength sufficient to permit pressure to be applied in the tar sand reservoir capable of further fracturing the reservoir.

6 Claims, No Drawings

PRODUCING HEAVY OIL FROM TAR SANDS

BACKGROUND OF THE INVENTION

This invention relates to the recovery of heavy oil from subterranean sand formations containing viscous tar-like petroleum materials. In one of its aspects this invention relates to the recovery of heavy oil by thermal driving techniques. In still another of its aspects this invention relates to maintaining optimum porosity of the tar sand formation during thermal driving of heavy oil through the formation. In still another of its aspects this invention relates to the introduction of foam into a tar sand formation as an aid in thermal drive technique for removing heavy oil from a tar sand reservoir.

Large deposits of tar sands such as those in the Athabasca district of Alberta, Canada, have been found in various parts of the world. These tar sand deposits can extend over large areas and in some places form reservoirs over 200 feet thick. These reservoirs sometimes occur close to the surface of the earth but, more generally, are covered by considerable overburden. These more deeply buried reservoirs constitute a considerable amount of the world's presently known petroleum deposits with the sand usually containing from about 6 percent to about 20 percent by weight of heavy oil. It is with reservoirs penetrated by wells at a depth in the range of 1200 feet or more that this invention is particularly concerned.

The heavy oil present is sufficiently viscous at the usual reservoir temperature, about 50° to 90° F, that it is immobile. If the temperature is raised above about 200° F the viscosity is decreased sufficiently that heavy oil will become mobile. The mobility of the heavy oil usually causes the sand formation to become incompetent along fractures produced in the usual techniques for recovering heavy oil from the reservoirs. This incompetency of the reservoir structure causes the heavy oil-depleted sand to fall away from the fracture walls by gravity and can lead to plugging of the porous portions of the reservoir or can lead to channeling of the steam used to heat the reservoir so that the steam passes through the reservoir without raising the temperature of the heavy oil the formation adequately to produce mobility of the heavy oil so that enough of it is produced from the formation to make the economics of the operation commercially attractive.

Thermal-drive methods, typically employing an injection well and a production well penetrating a reservoir formation with a hot fluid introduced through the injection well to transfer heat from the hot fluid as it passes through the formation to the production well so that the viscosity of the heavy oil within the formation is lowered and the heavy oil can be driven to the production well, are most commonly used to recover petroleum tar from underground tar sands. The relatively impermeable nature of the tar sand reservoirs requires that a fracture must be extended between the injection and production wells prior to or during the injection of the hot drive fluid. Even with fracturing techniques it has been found necessary to maintain pressure within the fractures to sustain the porosity of the fractures. This pressure is generally described as enough to overcome the pressure of the overburden weighing down upon the fracture.

If pressure is not maintained within the fracture it will tend to close and revert to its relatively impermeable state. The tar sand formations are usually sufficiently incompetent that propping agents do not prevent the closing of the fractures.

Maintaining sufficient pressure within the fractures to assure continuation of the porosity of the formation can cause the heating fluid to break through into the producing well at excessively high rates compared to the heavy oil being produced. This channeling of the heating fluid makes the operation uneconomical. A method for creating backpressure within the fractures and preventing, or at least retarding, excessive flow of steam through the fractures can be of great economic importance in the recovery of heavy oil from tar sand deposits.

It is therefore an object of this invention to provide a method for building a backpressure within the fractures of a tar sand deposit with the heated fluid used in treating the deposits. It is also an object of this invention to provide a method for retarding the flow of heated fluid through the fractures in the tar sand deposit being treated. It is another object of this invention to provide an improved method for recovering heavy oil from tar sand deposits.

Other aspects, objects and the various advantages of this invention will be apparent upon reading this specification and the appended claims.

STATEMENT OF THE INVENTION

A method is provided for recovering heavy oil from an underground tar sand reservoir in which the reservoir is penetrated with at least one injection well and at least one production well with steam being injected through at least one injection well at sufficient pressure to fracture the formation thereby joining the injection well and a production well and to heat the tar sand within the reservoir thereby mobilizing the heavy oil to flow to the production well. In this process for recovering heavy oil a slug of a surface-active agent dissolved or dispersed in a suitable carrier is injected through the injection well into the formation being treated thereby generating with the steam a condensible foam which is driven into the more permeable portions of the reservoir. The injection of the surface-active agent and the production of the condensible foam serves to build backpressure of steam within the treated reservoir and the foam also acts to retard the flow of the heating fluid through the fractures in the reservoir thereby at least partially diverting steam into permeable portions of the reservoir.

In a specific embodiment of the invention surface-active agent can be injected simultaneously with the injection of steam and with the interruption of the steam injection the injection of surface-active agent is continued. This embodiment can be stated as injecting steam and surface-active agent simultaneously with the interruption of this injection to allow the injection of a slug of surface-active agent.

It is quite common for various strata in a formation to have permeabilities sufficiently close to each other so that some amount of foam will be formed in the less permeable strata. When foam enters both types of strata the permeability of the more permeable stratum is reduced to a greater degree than that of a less permeable stratum. One of the factors causing this is a recognized phenomona that foam will reduce the effective permeability of a high permeability sand to a larger extent than it will affect a low permeability sand. Also, the more ready flow of steam into the more permeable stratum causes a larger heat input into that stratum compared to the heat loss from that stratum than there is in a less permeable sand. This results in a higher quality steam injected into the higher permeability stratum, and foam produced by this high quality steam will be longer lasting because it must lose more heat before the foam will collapse. The high steam flow rate into the high permeability stratum during the initial injection of the foaming agent will carry the foaming agent to a greater depth in the high permeability zone and, therefore, form a much thicker wall of foam in that zone than is formed in the less permeable zones. It can be seen that the invention is workable in strata of any relative permeability.

Among the advantages of interrupting steam injection and then injecting surfactant so that there is a pattern of alternate steam and surfactant injections is that the back pressure of the steam in the formation can be observed and from this back pressure it can be determined if the foam is forming as desired from the surfactant as it is being injected. It is apparent that by observing the back pressure the injection of surfactant can be tailored to the particular formation being produced. This tailoring of the injections can be carried through the whole period of time within which the well is being produced by steam injection. After steam and surfactant have been alternately injected for a period of time it will become apparent by the back pressure of the steam whether the foam is breaking down. If the foam is breaking down, steam injection can be interrupted and additional surface-active agent can be injected to increase the foam in the formation as needed to maintain the back pressure of the steam at a certain desired level.

It can also be desirable to reverse the function of the injection well and the production well periodically so that flow through the reservoir is reversed. This procedure has the advantage of better penetrating the total reservoir with more intimate contact of steam with the tar sand throughout the reservoir.

Although the invention has been described with respect to the use of steam as the condensible gas, it should be evident that any gas which is condensible at the temperature and pressure conditions in the particular strata should be equally useful to produce a temporary, self-destructive foam. Similarly, small amounts of non-condensible gases can be mixed with the condensible gas to vary the length of life of the foam. In general, however, because of the low cost and ready availability of steam the invention would be practiced with steam alone.

Various types of surface-active agents could be used in the process of my invention, either nonionic, anionic, or cationic. Commercial surface-active agents of the alkyl phenoxy polyethoxy ethanol class and commonly available household cleansers have been tested and found satisfactory in the practice of my invention. For example, Trend detergent manufactured by Purex Corporation, Ltd., has proved satisfactory, as well as other household cleaning compounds, hand and laundry soaps, and rug shampoos.

Nonionic type surface-active agents such as Triton X-100 and Igepal CO-990 are examples of the alkyl phenoxy polyethoxy ethanol class which are satisfactory in the practice of my invention. Anionic type surface-active agents such as Alconox and Trend are examples of the alkyl aryl sulfonate class usable in the practice of my invention. Ethomeen 18/60 and Arquad C-50 are examples of cationic surface-active agents which are usable in carrying out my invention, and are identified chemically as stearyl amine polyethylene oxide and n-alkyl trimethyl ammonium chloride, respectively.

To practice this invention it is desirable to inject a liquid solution or dispersion of the surfactant, or mixture of surfactants which cause the steam to foam. Since a wide range of conditions exist at the well-head and a wide range of foaming surfactants are usable, it is also within the scope of the invention to have a wide range of carrier liquids. Liquids which are frequently used in the marketing and transportation of surfactants are alcohols, oils and water or mixtures thereof. Such fluids can also be used to advantage in conjunction with the steam foam producing surfactants to clean some of the mineral and organic deposits from the well although the main function in this invention is as a carrier for the surfactant. It is also desirable to have a liquid which does not become viscous or freeze at winter conditions.

Alcohols containing 3 to 8 carbon atoms can be used with the surfactants which are injected into the well. Hydrocarbon oils having a boiling range of 250° to 850° F can serve as the liquid carrier for the surfactants. Water substantially free of salt is used in the steam generators. However, the water used as a carrier for the surfactants may be salt free or contain up to about 5 weight percent of salt. Produced water containing 2-5 weight percent salt can be employed.

EXAMPLE I

Consider two wells completed in a tar sand spaced 330 feet apart drilled to a depth of 1500 ft. A fracture is created between the two wells by using conventional means such as hydraulic fracturing, or by injecting steam at pressures greater than the fracturing pressure. About 75,000 barrels of water are injected as steam at about 400° F to clean the tar out of the fracture and heat a zone about two feet on either side of the fracture. Since the cleaned-out portion outside the fracture (about ½ foot wide) is essentially unconsolidated sand, the steam permeability in this 0.5 foot wide section will be about 4000 md. Because of the presence of the heated tar in the zones two feet on either side of the fracture the steam permeability in this zone will be about 200 md. Thus the steam injected will flow over 70 percent into the 0.5-foot cleaned-out section and only 30 percent into the adjacent heated zones which extend out 2 feet from the fracture.

By injecting 320 barrels of water containing 9000 pounds of foaming agent Bio Soft B-40 (a sodium linear alkylate sulfonate, manufactured and marketed by Stepan Chemical Co., Edens and Winnetka Road, Northfield, Illinois 60093) with the steam, a foam is created largely in the cleaned-out 0.5 ft. section. After creation of the foam in excess of 90 percent of the subsequent steam will be injected into the adjacent heated zones as a result of the presence of the foam in the cleaned-out section. Less than 10 percent of the steam will enter the 0.5 ft. section filled with foam.

EXAMPLE II

To illustrate the benefit of injecting steam both into the injection well and the normally producing well, less heat will be required to cause a hot path to be created between the two wells of Case A. By heating through only one well as in Case A, the amount of steam to heat the fracture and the two adjacent two-foot zones would be about 75,000 barrels of water as steam at 400° F. Only about 30,000 total barrels of water as steam at 400°

F are needed to heat a path between the wells provided about half the steam is injected into each well.

The benefits of creating foam by injecting into both wells is similarly illustrated since only about half as much foaming surfactant (approximately 4500 pounds) is needed to create foam from one well to the other provided the injection of the foaming agent used is about equally split between the two wells.

The examples above illustrate two embodiments within the scope of this invention. The examples are not to be taken as limiting the scope of the invention.

I claim:

1. In the recovery of heavy oil from an underground tar sand reservoir by injecting steam into at least one injection well penetrating said reservoir so that permeability of the reservoir is obtained and the tar sand contacted by the steam is heated and mobilized, heavy oil is produced from at least one producing well penetrating the reservoir, the improvement of:
    a. injecting a surface-active agent dissolved or dispersed in a suitable carrier into at least one injection well, thereby
    b. generating a condensible foam,
    c. penetrating the more permeable portions of said reservoir with said foam, thereby
    d. diverting steam into less permeable portions of said reservoir, and
    e. injecting an amount of steam into said underground tar sand reservoir to, at least, elevate the pressure in the reservoir contained by said condensible foam sufficiently to sustain the porosity of the tar sand reservoir.

2. A method of claim 1 wherein foam is continuously generated in said reservoir.

3. A method of claim 1 wherein foam is intermittently generated within said reservoir.

4. A method of claim 1 wherein said production and injection wells are periodically reversed in function so that flow into and out of said reservoir is periodically reversed.

5. A method of claim 1 wherein said active agent is dissolved or dispersed in a carrier liquid chosen from among alcohols, oils, water and mixtures thereof.

6. A method of claim 1 wherein sufficient steam is injected into said underground tar sand reservoir to raise the pressure in the portion of the reservoir contained by said condensible foam to cause fracture of said tar sand reservoir.

* * * * *